W. H. DOCK.
HOE.
APPLICATION FILED MAY 26, 1914.
1,153,202.
Patented Sept. 14, 1915.
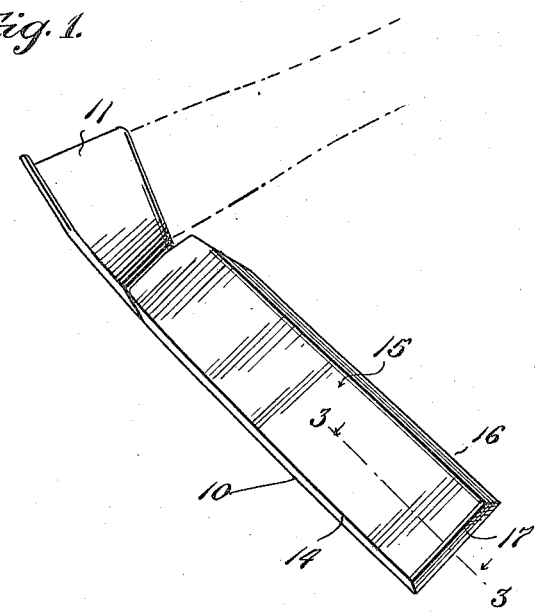
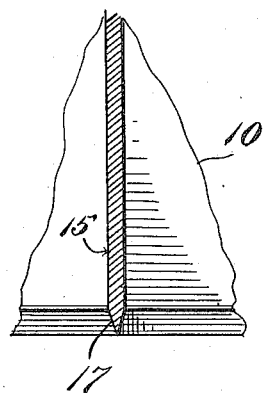
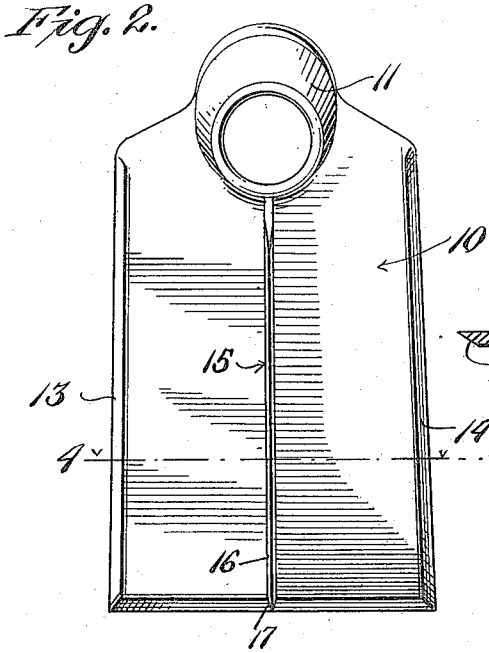
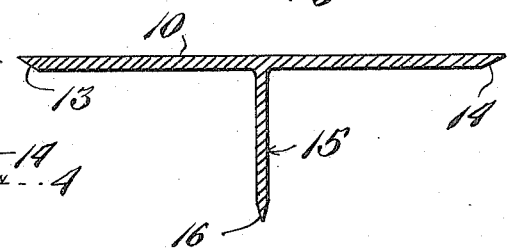
Witnesses
Inventor
W. H. Dock
By
Attorney

UNITED STATES PATENT OFFICE.

WILLIAM HENRY DOCK, OF WILMINGTON, NORTH CAROLINA.

HOE.

1,153,202. Specification of Letters Patent. Patented Sept. 14, 1915.

Application filed May 26, 1914. Serial No. 841,074.

*To all whom it may concern:*

Be it known that I, WILLIAM HENRY DOCK, a citizen of the United States, residing at Wilmington, in the county of New Hanover, State of North Carolina, have invented certain new and useful Improvements in Hoes; and I do hereby declare the following to be a full, clear, and exact description of the invention, such as will enable others skilled in the art to which it appertains to make and use the same.

This invention relates to hoes and particularly that type known as grubbing hoes.

The object of the invention resides in the provision of a hoe of the type named embodying an improved construction which will enable the user to sever roots running parallel to the plane of the main blade or at various angles to the plane of the main blade without changing his position or wasting any energy.

A further object of the invention resides in the provision of a hoe of the character named embodying an improved construction enabling the user to execute the work imposed on the hoe more rapidly, and which will be simple in construction, efficient in use and capable of being manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which Figure 1 is a side elevation of a grubbing hoe constructed in accordance with the invention; Fig. 2, a rear view of same; Fig. 3, a section on the line 3—3 of Fig. 1; and Fig. 4, a section on the line 4—4 of Fig. 2.

Referring to the drawings the improved hoe is shown as comprising a main blade 10 provided with the usual handle socket 11 at the inner end thereof. The outer edge of the main blade is sharpened, while the side edges of said blade are sharpened as at 13 and 14 by being ground only upon the one side of the blade.

The improved hoe further embodies a supplemental blade 15 secured to the rear side of the main blade 10 and extending longitudinally of the latter. This supplemental blade 15 is provided with a longitudinal cutting edge 16 and a transverse cutting edge 17 the latter being disposed substantially in the plane of the cutting edge 12 of the main blade and at right angles to the longitudinal cutting edge 16 of the supplemental blade.

It will be obvious that in the use of a hoe constructed as set forth the supplemental cutting blade 15 will sever roots running parallel to the main blade 10 and also roots disposed at various angles to the plane of the main blade so that the necessity of the user constantly changing his position in order to sever such roots is obviated, with resultant time saved and energy conserved.

It will be further noted that by providing a hoe having five distinct cutting edges the effectiveness of same is materially enhanced.

What is claimed is:—

A hoe of the class described comprising a main blade having a handle socket at its inner end and its sides and outer end ground to form cutting edges, and a supplemental blade secured to the rear of the main blade and disposed centrally and longitudinally of the latter, said supplemental blade having longitudinal and transverse cutting edges, the latter being disposed substantially in the plane of the cutting edge at the outer end of the main blade and at right angles to the longitudinal cutting edge of the supplemental blade.

In testimony whereof, I affix my signature, in the presence of two witnesses.

WILLIAM HENRY DOCK.

Witnesses:
JAMES OWEN REILLY,
P. F. B. PRICE.

Copies of this patent may be obtained for five cents each, by addressing the "Commissioner of Patents, Washington, D. C."